United States Patent [19]

Gardner

[11] Patent Number: 4,751,386
[45] Date of Patent: Jun. 14, 1988

[54] LEAN DETECTOR FOR DETERMINING THE OFFSET OF AN AXIS OF SYMMETRY OF A CONTAINER FROM ITS NORM

[75] Inventor: Edward B. Gardner, Bloomfield, Conn.

[73] Assignee: Emhart Industries, Inc., Farmington, Conn.

[21] Appl. No.: 32,838

[22] Filed: Mar. 31, 1987

[51] Int. Cl.⁴ ............................................. G01B 11/08
[52] U.S. Cl. ................................ 250/223 B; 250/224; 209/524; 209/530; 356/428
[58] Field of Search ............... 250/224, 223 R, 223 B; 356/434, 428; 209/522–525, 530–533

[56] References Cited

U.S. PATENT DOCUMENTS

| | | | |
|---|---|---|---|
| 3,089,594 | 5/1963 | Early | 209/524 |
| 3,265,901 | 8/1966 | Schneider | 209/524 |
| 3,365,699 | 1/1968 | Foster | 209/524 |
| 3,690,456 | 9/1972 | Powers, Jr. | 209/524 |
| 3,716,136 | 2/1973 | Birner et al. | 209/524 |
| 3,754,123 | 8/1973 | Keller | 250/223 B |
| 3,932,042 | 1/1976 | Faani et al. | 209/524 |
| 4,004,904 | 1/1977 | Fergusson | 65/158 |
| 4,019,050 | 4/1977 | Axelrod | 250/223 R |
| 4,107,523 | 8/1978 | Corman | 250/223 B |
| 4,165,277 | 8/1979 | Frewin | 209/526 |
| 4,165,939 | 8/1979 | Woodrow et al. | 250/223 R |
| 4,170,417 | 10/1979 | Tourres | 250/223 B |
| 4,205,973 | 6/1980 | Ryan | 250/224 |
| 4,209,387 | 6/1980 | Scherf | 209/530 |
| 4,213,042 | 7/1980 | Beach et al. | 250/223 B |
| 4,266,961 | 5/1981 | Wood | 65/29 |
| 4,293,219 | 10/1981 | Ducloux | 250/223 B |
| 4,411,522 | 10/1983 | O'Connor et al. | 250/223 B |
| 4,435,641 | 3/1984 | Hajime | 250/223 B |
| 4,459,487 | 7/1984 | Leser | 250/223 B |
| 4,476,533 | 10/1984 | Daudt et al. | 250/560 |
| 4,500,203 | 2/1985 | Bieringer | 356/240 |
| 4,509,075 | 4/1985 | Simms et al. | 250/223 B |
| 4,553,217 | 11/1985 | Daudt et al. | 250/224 |
| 4,579,227 | 4/1986 | Miller | 209/526 |
| 4,580,045 | 4/1986 | Kulig | 250/223 B |
| 4,608,709 | 8/1986 | Hedler et al. | 250/223 B |
| 4,610,542 | 9/1986 | Ringlien | 356/240 |
| 4,691,231 | 9/1987 | Fitzmorris et al. | 250/223 B |

Primary Examiner—Edward P. Westin
Assistant Examiner—Charles F. Wieland
Attorney, Agent, or Firm—Arthur J. Samodovitz

[57] ABSTRACT

A lean detector comprises a first light source for determining the time of arrival of a container at an inspection site, a second light source for determining the time of arrival of a portion of the container at a predetermined position at the inspection site and a third light source for determining the time of arrival of another portion of the container at another predetermined position at the inspection site. The second and third light sources are perpendicular to each other. A guide rail laterally positions the container at the inspection site. Before real containers are inspected, a non-leaning test container is passed through the inspection site and the times of arrival of the corresponding second and third portions of the test container relative to the time of arrival of the container at the inspection site are determined to serve as reference values. Then, after a real container passes through the inspection site and the times of arrival measured, the reference values are subtracted from the times of arrival of the second and third portions of the real container at the inspection site so that it is not necessary to precisely position the light source relative to each other or relative to the guide rail in order to accurately determine the amount of lean of the real container.

19 Claims, 4 Drawing Sheets

LEAN DETECTOR FOR DETERMINING THE OFFSET OF AN AXIS OF SYMMETRY OF A CONTAINER FROM ITS NORM

BACKGROUND OF THE INVENTION

The invention relates generally to container inspection apparatus and deals more particularly with a lean detector for containers and other products.

Glass containers are often manufactured at a high rate by an individual section machine, and it is important to inspect the containers for lean. Lean is a condition typically characterized by inclination of a center axis of the container. Containers exhibiting excessive lean are ordinarily rejected.

Various lean detectors of containers have been previously known. For example, in U.S. Pat. No. 3,754,123 to Keller, a lean detector comprises sources of light which project two mutually perpendicular light beam patterns across a continuously moving conveyor toward an array of light sensitive devices arranged in pairs for inspecting the silhouette of articles on the conveyor. The lean inspection circuitry includes a pulse generator and counter capable of providing two signals indicative of the degree of lean of the article in two mutually perpendicular directions. These signals are squared and summed to indicate the total amount of lean of the container and then compared to a predetermined level to determine whether the container leans excessively.

U.S. Pat. No. 3,716,136 to Birner et al discloses apparatus for inspecting the peripheral portions of an article to determine whether the shape of the article is acceptable. If the peripheral portions are in predetermined relation to one another as detected by a plurality of light sources aimed at the peripheral portions, then the container has a suitable shape.

Some of the previously known lean detectors require an excessive number of light sources and detectors, and precise positioning of the light sources at precise angles relative to each other and the containers.

Accordingly, a general object of the present invention is to provide a lean detector which requires a minimal number of light sources and detectors, and does not require precise positioning of the light sources relative to each other or the containers.

Another general object of the present invention is to provide suitable processes to implement the foregoing object.

SUMMARY OF THE INVENTION

The invention resides in an apparatus for detecting lean of a real container moving on a conveyor at an inspection site and includes a first light source for projecting a first beam of light toward the inspection site and a first, associated light detector for detecting the arrival of a first portion of the real container and a corresponding first portion of a non-leaning test container at a first predetermined position at the inspection site. The first light source initiates the lean detection operation. The apparatus also includes a second light source for projecting a second beam of light toward the inspection site and a second, associated light detector for detecting the arrival of a second portion of the real container and a corresponding second portion of the test container at a second predetermined position at the inspection site. A third light source projects a third beam of light toward the inspection site and a third, associated light detector detects the arrival of a third portion of the real container and a corresponding third portion of the test container at a third predetermined position at the inspection site. According to one feature of the invention, the second and third light beams are approximately perpendicular to each other. A timer measures the elapsed time between the arrival of the first portion of the test container at the first predetermined position and the arrival of the second portion of the test container at the second predetermined position, a second elapsed time between the arrival of the first portion of the test container at the first predetermined position and the arrival of the third portion of the test container at the third predetermined position, a third elapsed time between the arrival of the first portion of the real container at the first predetermined position and the arrival of the second portion of the real container at the second predetermined position, and a fourth elapsed time between the arrival of the first portion of the real container at the first predetermined position and the arrival of the third portion of the real container at the third predetermined position. A processor normalizes the third and fourth elapsed times based on the first and second elapsed times to correspond to the lean of the real container irrespective of its precise lateral position on the conveyor. According to one feature of the invention, this normalization is accomplished by subtracting the first elapsed time from the third elapsed time, and subtracting the second elapsed from the fourth elapsed time. This normalizes the third elapsed time to correspond to the lean of the real container in one direction by removing the component of the third elapsed time which is due to the lateral distance of the container from the point of intersection of the second and third light beams and a longitudinal distance of the first light beam from the aforesaid point of intersection. Similarly, the processor normalizes the fourth elapsed time.

According to another optional feature of the invention, the third and fourth normalized times are squared and summed together to correspond more directly to the actual amount of lean of the real container. The normalization greatly facilitates the set-up of the light sources relative to each other and the lateral position of the containers at the inspection site.

The invention also resides in related processes.

DETAILED DESCRIPTION OF THE PREFERRED EMBODIMENTS

Figure 3A:
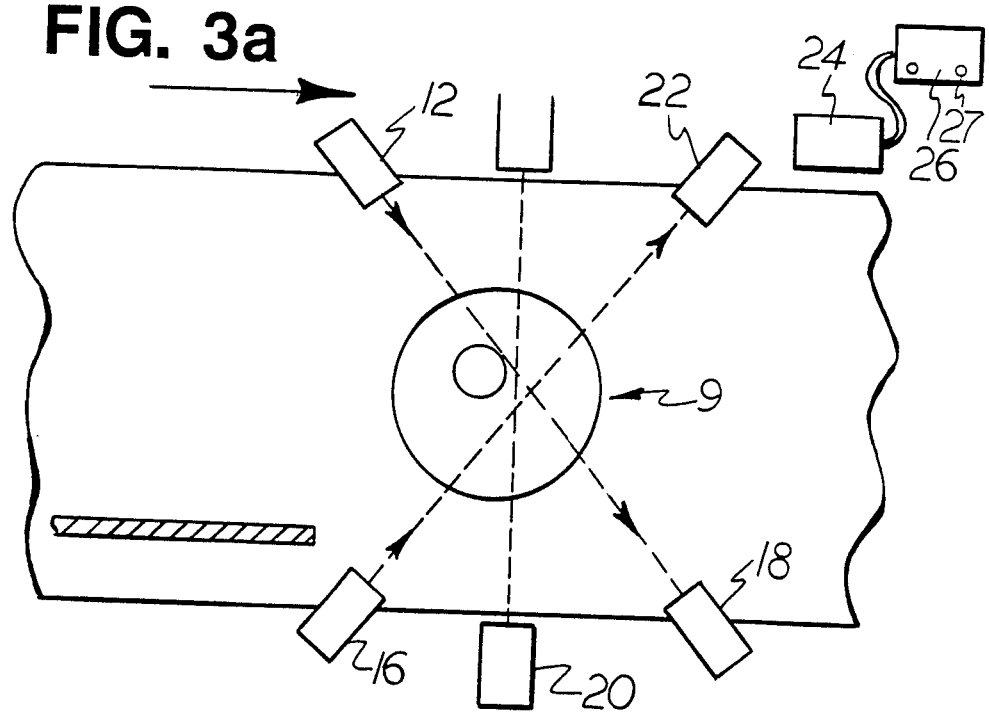
FIG. 3(a) is a schematic, top plan view of the inspection apparatus of FIG. 1 performing a lean detection operation on a real, leaning container.
Figure 3B:
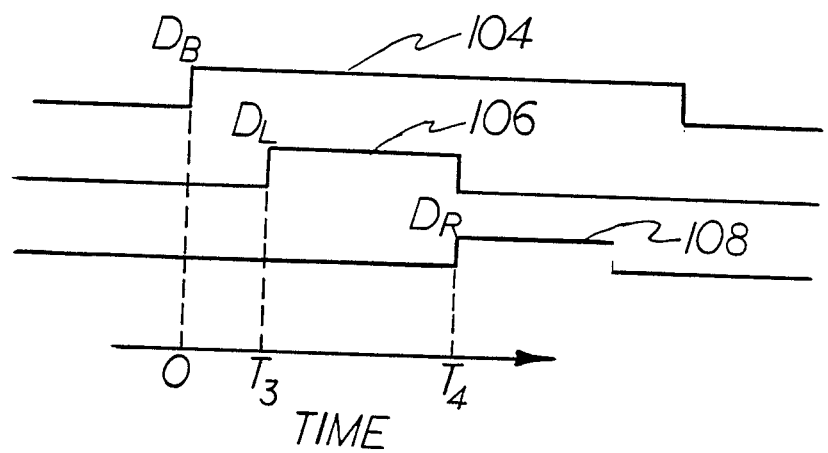
FIG. 3(b) is a timing diagram illustrating electronic signals produced by the lean detector of FIG. 1 corresponding to the positioning and lean of the real container in FIG. 3(a).

FIG. 1 illustrates a lean detector generally designated 10 embodying the present invention and a conveyor 11 for serially transporting containers 8, 9 to an inspection site. The lean detector 10 comprises three light sources 12, 14 and 16 and three associated light detectors 18, 20 and 22. The container 8 is a non-leaning test container and the container 9 illustrated in FIG. 3(a) is an actual glass container which exhibits substantial lean. The lean detector 10 further comprises a guide rail 23 to guide the containers to the inspection site at the same location relative to the width of the conveyor, an electronic processor 26 to process the outputs of the detectors 18, 20 and 22 and a rejector 24 activated by the processor 26 to reject an excessively leaning container. For further details of other features of the inspection apparatus, reference may be made to U.S. Pat. Nos. 3,754,123 to Keller, issuing Aug. 21, 1973, 4,580,045 to Kulig, issuing Apr. 1, 1986 and 3,690,456 to Powers, issuing Sept. 12, 1972, which patents are hereby incorporated by reference as part of the present disclosure.

Figure 1A:
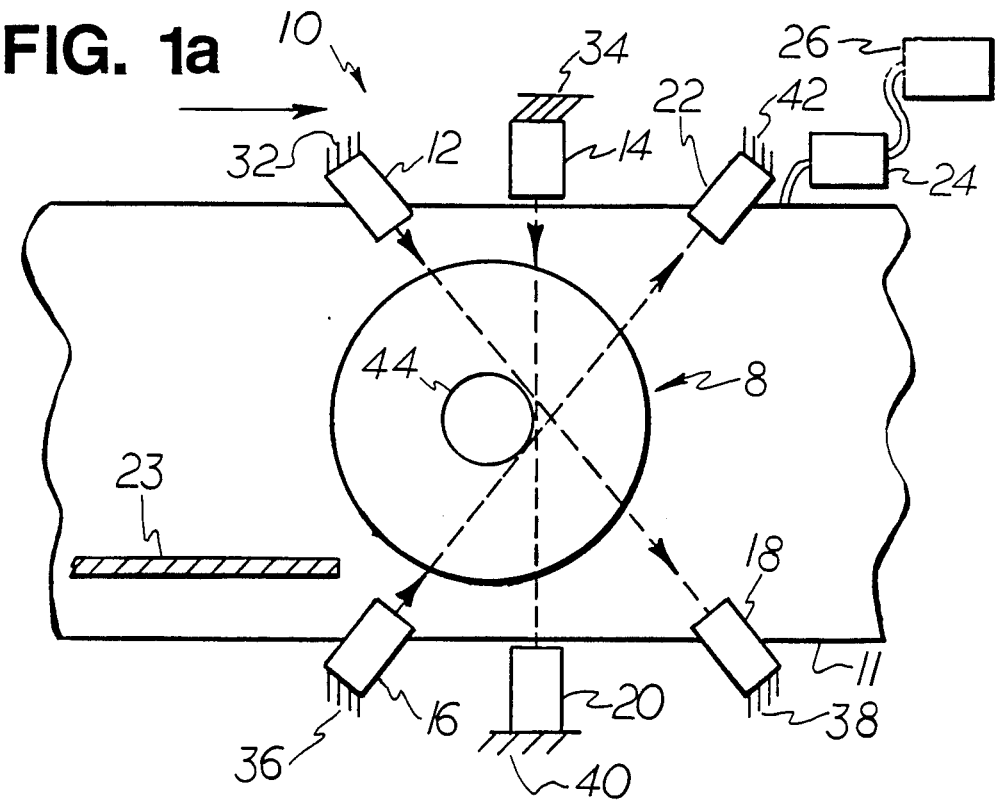
FIG. 1(a) is a schematic top plan view of an inspection apparatus including a lean deteotor embodying the present invention. The apparatus is shown detecting the position of a non-leaning, test container.
Figure 1B:
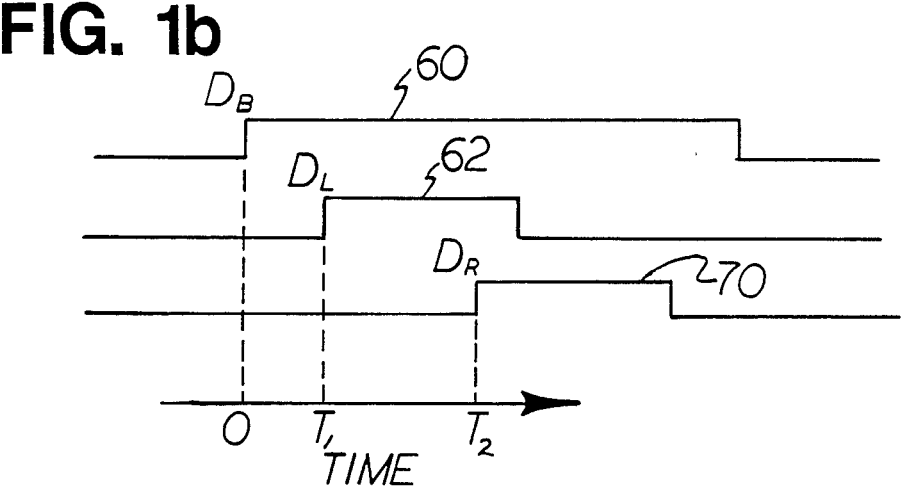
FIG. 1(b) is a timing diagram illustrating electronic signals generated by the lean detector of FIG. 1(a) and indicative of the positioning of the test container.

As further illustrated in FIG. 1(a), the light source 12 is supported by a bracket 32 to project a beam of light at 45° relative to the direction of conveyance of the containers at the height of a finish portion 44 of the container 8, and the associated light detector 18 is supported by a bracket 38 to receive such light when not interrupted by the container finish 44. The light source 16 is supported by a bracket 36 to project a beam of light at 45° relative to the direction of motion of the container 8 and perpendicular relative to the beam of light projected by the light source 12, and at a height corresponding to the finish portion 44 of the container 8. The light detector 22 is supported by a bracket 42 to receive the light transmitted by the detector 16 when such light is not interrupted by the finish portion 44. By way of example, the light sources 12 and 16 are supported in a common horizontal plane to project their light beams in a common plane at the height of the finish portion 44. The light source 14 is supported by a bracket 34 to project a beam of light at 90° relative to the direction of motion of the container 8 and slightly above the surface of the conveyor 11 so that the light beam projects at the level of the bottom or heel portion of the container 8. The light sensor 20 is supported by a bracket 40 to receive the light transmitted by the source 14 when not interrupted by the container 8. By way of example, the light beam of the source 14 is transmitted horizontally.

Figure 2:
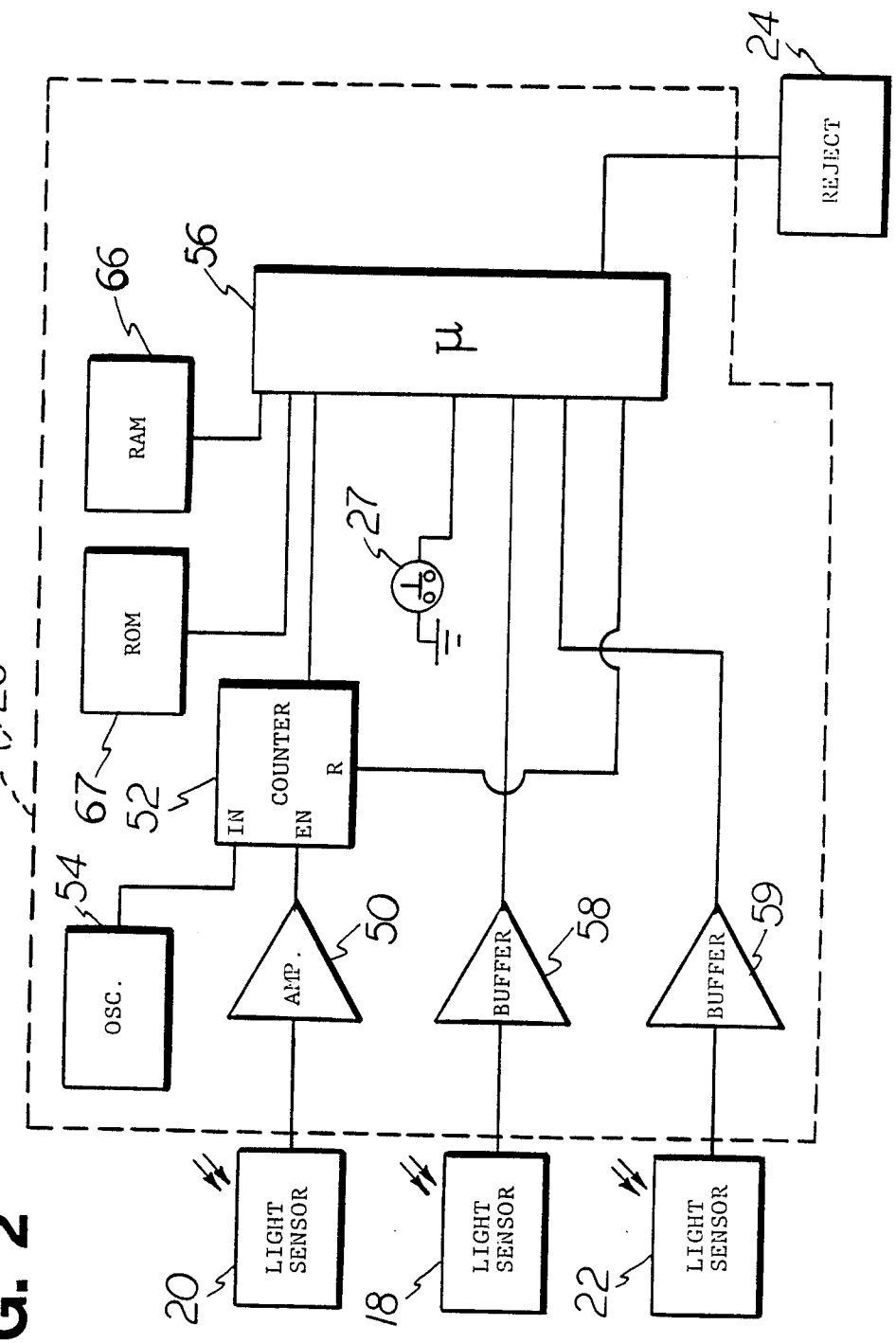
FIG. 2 is a schematic block diagram of electronic circuitry within an electronic processor of the lean detector of FIG. 1.

FIG. 2 illustrates electronic circuitry within the electronic processor 26. The processor 26 includes a push button 27 which signals the microprocessor when the test container 8 approaches the inspection site, and to prepare for a test (step 69 in FIG. 4). The output of the light sensor 20 is buffered by an amplifier 50 and used to enable a counter 52 to begin a lean detection operation when the container 8 first breaks the light beam of the source 14. At such time, the counter 52 begins counting pulses of a high frequency oscillator 54. It should be noted that in typical circumstances, the bottom portion of the container 8 is much wider than the finish portion 44 so that the beam of the source 14 is the first beam which is broken. The breaking of the beam of the source 14 and the deactivation of the associated light detector 20 is represented by the onset of a pulse 60 at the output of the detector 20 illustrated in FIG. 1(b) which pulse begins at a time zero.

When the container 8 advances further downstream, in the illustrated embodiment, the light beam of the source 12 is next broken by the finish portion 44 and a corresponding signal is sent via the detector 18 to a buffer 58 within the electronic processor. The breaking of the beam of the light source 12 and the deactivation of the associated light detector 18 is indicated by the onset of a pulse 62 at the output of the detector 18 illustrated in FIG. 1(b) which pulse begins at a time T1. The buffer 58 in turn signals a microprocessor 56 to read the output of the counter 52 to indicate the time T1 that the light source 12 beam was broken relative to the breaking of the light source 14 beam. The time T1 is stored in a Random Access Memory (RAM) 66 within the electronic processor (step 73 of FIG. 4 flowchart).

A short time later, the container 8 has proceeded downstream to a location at which the finish portion 44 breaks the beam of the source 16 at which time the detector 22 activates a buffer 59 which signals the microprocessor 56 to read the output of the counter. The breaking of the beam of the light source 16 and the deactivation of the oorresponding light deteotor 22 generates a pulse 70 at the output of the detector 22 illustrated in FIG. 1(b) which pulse begins at a time T2 read from the counter 52 by the microprocessor 56. The microprocessor then stores the time T2 in the RAM 66 (step 75 of FIG. 4 flowchart). Next, the microprocessor resets the counter 52 (step 76 in FIG. 4).

It should be noted that in the illustrated arrangement of FIG. 1(a), the container 8 is a test container which exhibits zero lean and may be machined out of metal. Consequently, the values of T1 and T2 correspond to the lateral positioning of the container 8 and its finish portion 44 at the inspection site after engagement with the guide rail 23, and serve as reference values for subsequent testing of actual containers. The arrangement of FIG. 1(a) illustrates the fact that it is often difficult to precisely position the guide rail 23 so that the bottle is positioned at precisely the midpoint of the conveyor. However, in accordance with the objects of the invention, because of the storage of the reference times T1 and T2, it is not necessary to have such precise positioning of the bottle, and set-up is facilitated.

Figure 4:
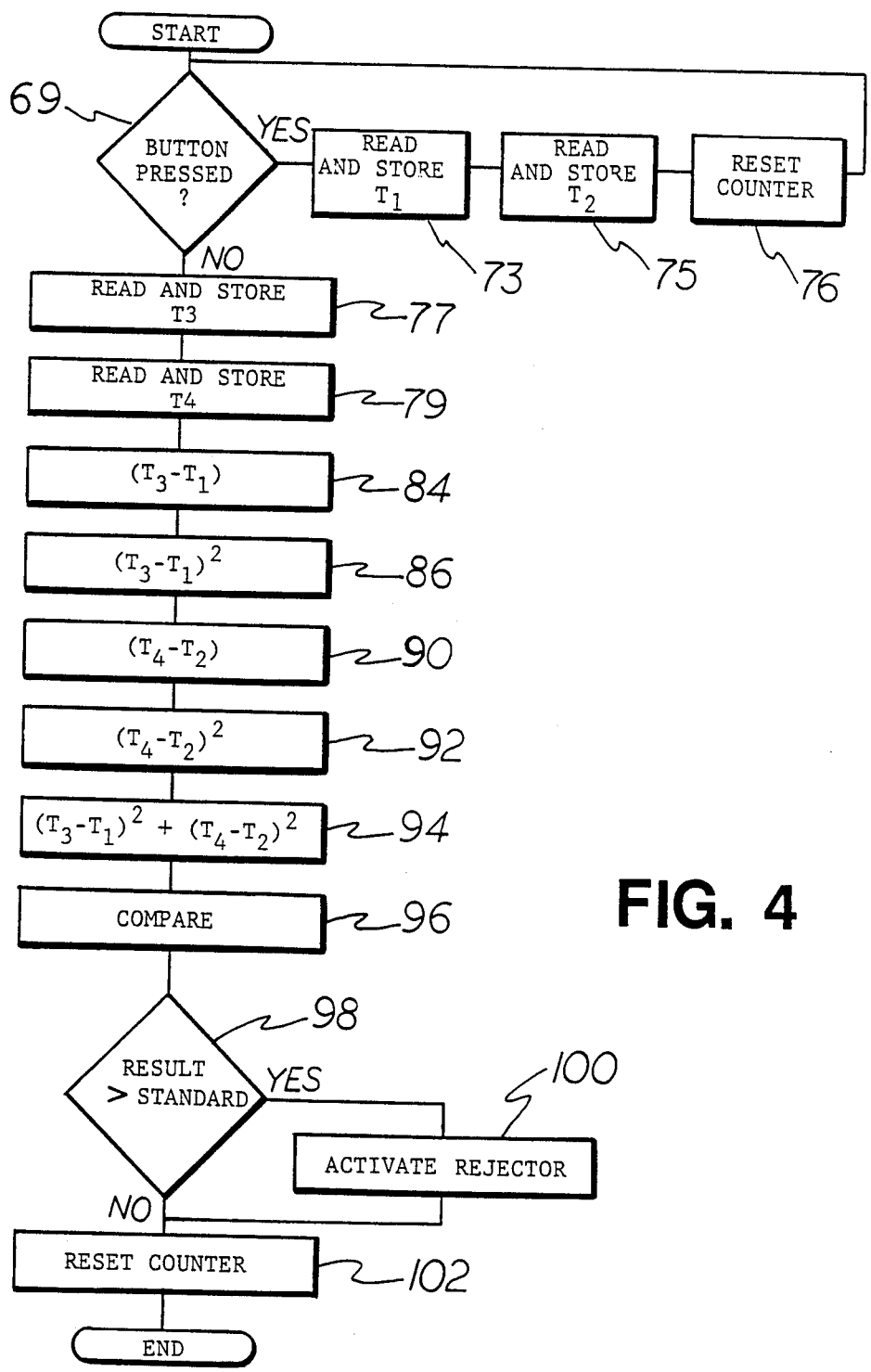
FIG. 4 is a flowchart illustrating the operation of the lean detector of FIG. 1 and a computer program which controls the electronic processor of FIG. 1.

A lean detection operation for an actual container 9 illustrated in FIG. 3(a) at the inspection site will now be described with the aid of the flowchart of FIG. 4. The flowchart comprises a computer program stored within a read only memory (ROM) 67 within the processor 26. The container 9 passes through the inspection site and successively breaks the light beams of the sources 14, 12 and 16. This causes the associated light detectors 20, 18 and 22 to generate successive deactivation pulses 104, 106 and 108, respectively beginning at times 0, T1, T4, respectively. In the manner noted above the onset of the pulse 104 activates the buffer 50 to enable the counter 52, the onset of the pulse 106 activates the buffer 58 to signal the microprocessor 56 to read the output of the counter which then presents the time T3, and the onset of the pulse 108 activates the buffer 59 and signals the microprocessor 56 to read the output of the counter 52 which then presents the time T4. The times T3 and T4 are also stored in the RAM 66 (steps 77 and 79).

After the times T3 and T4 have been stored in the RAM 66, the microprocessor subtracts the reference time T1 from the actual time T3 (step 84). This normalizes the time T3 to correspond to the lean of the container 9 in one direction by removing the component of T3 which is due to the lateral distance of the container from the point of intersection of the source 12 and 16 light beams and the longitudinal distance of the source 14 beam from the aforesaid point of intersection. Then the microprocessor squares the normalized result (step 86). Then, the microprocessor subtracts the reference time T2 from the actual time T4 (step 90) and squares the result (step 92). This normalizes the time T4 to correspond to the lean of the container 9 in a perpendicular direction in the same manner noted above. Then, the microprocessor 56 sums the two squares (step 94) to determine the total lean and compares the sum to a predetermined level (step 96. This indicates whether the container leans excessively (step 98) and if so, the microprocessor 56 activates the rejector 24 in time with the arrival of the excessively leaning container in front of the rejector (step 100). If the squared sum is less than the predetermined level, then the microprocessor resets the counter 52 (step 102) and awaits the arrival of the next container 9 at the inspection site.

By the foregoing, lean detection apparatus embodying the present invention have been disclosed. However, numerous substitutions and modifications may be made without deviating from the scope of the invention. For example, it is not absolutely necessary that the light sources 12 and 16 project at 90° relative to each other although such perpendicularity most truly indicates lean in any direction. Also, if desired, the step of taking the square root of the sum of the squares derived in the step 94 may be performed to determine the actual lean before comparison to a different reference standard. Therefore, the invention has been disclosed by way of illustration and not limitation.

I claim:

1. An apparatus for detecting lean of a real container moving on a conveyor at an inspection site, said apparatus comprising:
   first light source means for projecting a first beam of light toward said inspection site and first light detector means associated with said first light source means for detecting the arrival of a first portion of said real container and a corresponding first portion of a non-leaning test container at a first predetermined position at said inspection site,
   second light source means for projecting a second beam of light toward said inspection site and second light detector means associated with said second light source means for detecting the arrival of a second portion of said real container and a corresponding second portion of said test container at a second predetermined position at said inspection site,
   third light source means for projecting a third beam of light toward said inspection site and third light detector means associated with said third light source means for detecting the arrival of a third portion of said real container and a corresponding third poztion of said test oontainer at a third predetermined position at said inspection site,
   timing means coupled to said first, second and third detector means for determining a first elapsed time between the arrival of said first portion of said test container at said first predetermined position and the arrival of said second portion of said test container at said second predetermined position, a second elapsed time between the arrival of said first portion of said test container at said first predetermined position and the arrival of said third portion of said test container at said third predetermined position, a third elapsed time between the arrival of said first portion of said real container at said first predetermined position and the arrival of said second portion of said real container at said second predetermined position, and a fourth elapsed time between the arrival of said first portion of said real container at said first predetermined position and the arrival of said third portion of said real container at said third predetermined position, and
   processor means for normalizing said third and fourth elapsed times based on said first and second elapsed times to correspond to the lean of said real container irrespective of the precise alignment of said inspection site to said beams of light.

2. An apparatus as set forth in claim 1 wherein said processor means includes means for subtracting said first elapsed time from said third elapsed time and said second elapsed time from said fourth elapsed time.

3. An apparatus as set forth in claim 2 wherein said processor means includes means for squaring the result of each subtraction provided by said processor means.

4. An apparatus as set forth in claim 3 wherein said processor means includes means for summing said squares and comparing the sum to a predetermined level to determine whether said real container leans excessively.

5. An apparatus as set forth in claim 2 further comprising guide means located upstream of said inspection site for guiding said real and test containers to a common lateral position on said conveyor at said inspection site.

6. An apparatus as set forth in claim 1 wherein said timing means comprises a counter activated by the arrival of said first portion of said real or test container at said first predetermined position, and said processor means is adapted to read said counter when said second portion of said real or test container arrives at said second predetermined position and when said third portion of said real or test container arrives at said third predetermined position.

7. An apparatus as set forth in claim 1 further comprising guide means located upstream of said inspection site for laterally guiding said real and test containers on said conveyor to the same lateral position on said conveyor at said inspection site.

8. An apparatus as set forth in claim 7 wherein said guide means comprises a guide rail supported over said conveyor to engage said real and test containers as they are conveyed on said conveyor and guide said real and test containers to said same lateral position.

9. An apparatus as set forth in claim 1 wherein said second beam of light is approximately perpendicular to said third beam of light.

10. An apparatus as set forth in claim 9 wherein said first light source means is positioned to project said first beam of light approximately perpendicular to said conveyor.

11. A process for detecting lean of a real container moving on a conveyor to an inspection site, said process comprising the steps of:
   moving a non-leaning test container on said conveyor to said inspection site,
   projecting a first beam of light along a first path toward said inspection site and detecting the arrival of a first portion of said test container at a first predetermined position at said inspection site, projecting a second beam of light along a second path toward said inspection site and detecting the arrival of a second portion of said test container at a second predetermined position at said inspection site, projecting a third beam of light along a third path toward said inspection site and detecting the arrival of a third portion of said test container at a third predetermined position at said inspection site, determining a first elapsed time between the arrival of said second portion at said second predetermined position and the arrival of said first portion at said first predetermined position and a second elapsed time between the arrival of said third portion at said third predetermined position and the arrival of said first portion at said first predetermined position, moving said real container on said conveyor to said inspection site, projecting said first beam of light along said first path toward said inspection site and detecting the arrival of a first portion of said real container at said first predetermined position, projecting said second beam of light along said second path toward said inspection site and detecting the arrival of a second portion of said real container at said second predetermined position, projecting said third beam of light along said third path toward said inspection site and detecting the arrival of a third portion of said real container at said third predetermined position, said first, second and third portions of said real container corresponding to said first, second and third portions, respectively of said test container, determining a third elapsed time between the arrival of said second portion of said real container at said second predetermined position and the arrival of said first portion of said real container at said first predetermined position, and a fourth elapsed time between the arrival of said third portion of said real container at said third predetermined position and the arrival of said first portion of said real container at said first first predetermined position, normalizing said third and fourth elapsed times based on said first and second elapsed times, respectively to determine lean of said real container.

12. A process as set forth in claim 11 further comprising the step of guiding said test and real containers to a same transverse position on said conveyor at said inspection site.

13. A process as set forth in claim 12 wherein the normalizing step further comprises the steps of squaring the result of the subtraction of said first elapsed time from said third elapsed time and squaring the result of the subtraction of said second elapsed time from said fourth elapsed time.

14. A process as set forth in claim 13 wherein said normalizing step further comprises the step of summing said squares.

15. A process as set forth in claim 14 wherein said second beam of light is projected approximately perpendicular to said third beam of light.

16. A process as set forth in claim 12 wherein the normalizing step comprises the steps of subtracting said first elapsed time from said third elapsed time and subtracting said second elapsed time from said fourth elapsed time.

17. An apparatus for detecting lean of a real container moving on a conveyor at an inspection site, said apparatus comprising:

first detector means for detecting the arrival of a first portion of said first real container and a corresponding first portion of a non-leaning test container at a first predetermined position at said inspection site, second detector means for detecting the arrival of a second portion of said real container and a corresponding second portion of said test container at a second predetermined position at said inspection site, third detector means for detecting the arrival of a third portion of said real container and a corresponding third portion of said test container at a third predetermined position at said inspection site, guide means located upstream of said inspection site for laterally guiding said real and test containers on said conveyor to approximately the same lateral position on said conveyor at said inspection site, and wherein the arrival of said second and third portions of said test container at said second and third predetermined positions, respectively are effected by the lateral position of said test container at said inspection site and the arrival of said second and third portions of said real container at said second and third predetermined positions, respectively are effected by the lateral position of said real container at said inspection site and by the lean, if any, of said real container, and further comprising means receiving arrival information from said first, second and third detector means for distinguishing the lean, if any, of said real container from the lateral position of said real container at said inspection site by using the arrival information corresponding to said test container at said inspection site as a reference indicative of the lateral position of said real container at said inspection site caused by said guide means.

18. An apparatus as set forth in claim 17 wherein said guide means comprises a guide rail supported over said conveyor to engage said real and test containers as they are conveyed on said conveyor and guide said real and test containers to the same lateral position.

19. An apparatus as set forth in claim 17 wherein said first detector means comprises a first light source means for projecting a first beam of light toward said inspection site and first light detector means associated with said first light source means for detecting the arrival of said first portion of said real container and said corresponding first portion of said non-leaning test container at said first predetermined position, said second detector means comprises a second light source means for projecting a second beam of light toward said inspection site and second light detector means associated with said second light source means for detecting the arrival of said second portion of said real container and said corresponding second portion of said test container at said second predetermined position, and said third detector means comprises a third light source means for projecting a third beam of light toward said inspection site and third light detector means associated with said third light source means for detecting the arrival of said third portion of said real container and said corresponding third portion of said test container at said third predetermined position, said second beam of light being approximately perpendicular to said third beam of light.

* * * * *